United States Patent
Kus et al.

(10) Patent No.: US 10,243,953 B2
(45) Date of Patent: *Mar. 26, 2019

(54) SYSTEMS AND METHODS FOR SECURE RESOURCE ACCESS AND NETWORK COMMUNICATION

(71) Applicant: Box, Inc., Los Altos, CA (US)

(72) Inventors: Benjamin J. Kus, Alameda, CA (US); Jeremy S. Spiegel, San Francisco, CA (US); Jonathan S. Fan, Berkeley, CA (US); Peter B. Loer, Berkeley, CA (US)

(73) Assignee: Box, Inc., Redwood City, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 14/282,616

(22) Filed: May 20, 2014

(65) Prior Publication Data

US 2016/0119342 A1  Apr. 28, 2016

(51) Int. Cl.
*H04L 29/06* (2006.01)

(52) U.S. Cl.
CPC ...... *H04L 63/0876* (2013.01); *H04L 63/0272* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 7,305,562 B1 * | 12/2007 | Bianco | H04L 63/08 709/229 |
| 8,418,238 B2 | 4/2013 | Platt et al. | |
| 8,806,004 B2 | 8/2014 | Donzis et al. | |
| 8,886,925 B2 * | 11/2014 | Qureshi | G06F 21/10 713/150 |
| 8,909,749 B2 | 12/2014 | Branch et al. | |
| 9,203,820 B2 * | 12/2015 | Stuntebeck | H04L 63/08 |
| 9,253,210 B2 * | 2/2016 | Muppidi | H04L 63/20 |
| 9,378,359 B2 * | 6/2016 | Qureshi | G06F 21/10 |
| 9,716,728 B1 * | 7/2017 | Tumulak | H04L 9/083 |

(Continued)

OTHER PUBLICATIONS

"AirWatch Mobile Application Management—Deliver Apps that Keep Employees Productive," accessed on the internet at https://web.archive.org/web/20140507115848/http://www.airwatch.com/solutions/mobileapplicationmanagement; downloaded Jul. 21, 2015; 3pgs.

(Continued)

*Primary Examiner* — Farid Homayounmehr
*Assistant Examiner* — Thanh T Le
(74) *Attorney, Agent, or Firm* — Vista IP Law Group, LLP

(57) ABSTRACT

Systems and methods for secure resource access and network communication are provided. A plurality of policies are received on a client device, each policy comprising a respective resource and a respective permission for a respective action that can be performed by a user of the client device in regards to the resource. A first application, which is configured to store data in an encrypted repository on the client device, receives a request to open a resource. The first application determines that one of the policies prohibits access by the resource to the encrypted repository and, based thereon, selects a different second application to open the resource that does not have access to the encrypted repository. The second application then opens the resource.

12 Claims, 5 Drawing Sheets

(56) References Cited

U.S. PATENT DOCUMENTS

| | | |
|---|---|---|
| 2001/0056541 A1 | 12/2001 | Matsuzaki et al. |
| 2003/0037129 A1 | 2/2003 | Beadles et al. |
| 2003/0179240 A1 | 9/2003 | Gest |
| 2005/0044350 A1* | 2/2005 | White ................... G06F 21/606 713/151 |
| 2010/0242082 A1 | 9/2010 | Keene et al. |
| 2011/0154465 A1 | 6/2011 | Kuzin |
| 2012/0084570 A1 | 4/2012 | Kuzin |
| 2013/0029641 A1* | 1/2013 | Hickie ................... G06F 21/604 455/411 |
| 2013/0073703 A1 | 3/2013 | Das |
| 2013/0204398 A1* | 8/2013 | Minamizawa ...... G06F 21/6218 700/11 |
| 2013/0226792 A1 | 8/2013 | Kushevsky et al. |
| 2013/0254401 A1* | 9/2013 | Marshall ............. G06F 21/6218 709/226 |
| 2013/0332727 A1 | 12/2013 | Jaudon |
| 2014/0006347 A1* | 1/2014 | Qureshi .................. G06F 21/10 707/621 |
| 2014/0020078 A1* | 1/2014 | Canning ............. H04L 63/0815 726/8 |
| 2014/0032759 A1* | 1/2014 | Barton .................... H04L 67/10 709/225 |
| 2014/0082715 A1* | 3/2014 | Grajek ................. H04L 63/083 726/8 |
| 2014/0109174 A1* | 4/2014 | Barton .................. H04W 12/08 726/1 |
| 2014/0109243 A1 | 4/2014 | Ting |
| 2014/0157354 A1* | 6/2014 | Marshall ................ H04L 63/20 726/1 |
| 2014/0189777 A1* | 7/2014 | Viswanathan ........ H04L 63/105 726/1 |
| 2014/0189781 A1* | 7/2014 | Manickam .............. H04L 67/34 726/1 |
| 2014/0189782 A1* | 7/2014 | Mendelovich .......... G06F 21/33 726/1 |
| 2014/0208393 A1* | 7/2014 | Yasukawa ........ H04L 29/12509 726/4 |
| 2014/0282894 A1* | 9/2014 | Manton ................. H04L 63/102 726/4 |
| 2014/0282897 A1* | 9/2014 | Stuntebeck ............. H04L 63/08 726/4 |
| 2014/0297819 A1* | 10/2014 | Qureshi .............. H04L 41/0816 709/221 |
| 2015/0135303 A1* | 5/2015 | Makavy .............. H04L 63/0272 726/15 |

OTHER PUBLICATIONS

"AirWatch Mobile Application Management—Manage a Diverse Fleet of Devices in Your Enterprise," accessed on the internet at https://web.archive.org/web/20140507112730/http://www.airwatch.com/solutions/mobiledevicemanagement; downloaded Jul. 21, 2015; 3pgs.

"AirWatch Mobile Application Management," accessed on the internet at https://web.archive.org/web/ 20140507115851/ http://www.airwatch.com/solutions/ mobilecontentmanagement; downloaded Jul. 21, 2015; 6pgs.

Ping Identity. Ping Federate Java Integration Kit User Guide. Version 2.5.1. 2012.

* cited by examiner

SYSTEMS AND METHODS FOR SECURE RESOURCE ACCESS AND NETWORK COMMUNICATION

BACKGROUND

The present disclosure relates generally to secure resource access and, more particularly, to systems and methods for policy-based network access of secure resources associated with an organization from personal user devices.

Corporations and other organizations often find it beneficial to provide their employees with remote access to internal resources from desktops, laptops, mobile phones, tablets, and other personal and corporate devices. Opening up an enterprise network to external access, whether by virtual private network (VPN) or other means, however, exposes the network to additional security risks, particularly if the network is accessed by personal devices over which an organization does not have full control. On the other side, device users are wary of having their employers exert control over their personal devices, even if in a limited fashion, in order to allow remote access to an enterprise network.

BRIEF SUMMARY

Systems and methods for providing secure access to enterprise network resources from client devices outside the network perimeter are described herein. In one aspect, a computer-implemented method includes the steps of: receiving on a client device a plurality of policies, each policy comprising a respective resource and a respective permission for a respective action that can be performed by a user of the client device in regards to the resource; receiving by a first application a request to open a resource wherein the first application is configured to store data in an encrypted repository on the client device; determining by the first application that one of the policies prohibits access by the resource to the encrypted repository and, based thereon, selecting a different second application to open the resource that does not have access to the encrypted repository; and causing the second application to open the resource.

In one implementation, the resource does not reside within an enterprise network of the user. A particular application can be a web browser or a native application. The resource can be a uniform resource locator.

In another implementation, the method further includes: receiving by the first application a request to open a second resource; and determining by the first application that one of the policies allows access by the second resource to the encrypted repository and, based thereon, opening by the first application the second resource.

In a further implementation, the method further includes: receiving by the first application a request to open a second resource; and determining by the first application that one of the policies allows access by the second resource to the encrypted repository and, based thereon, causing the second resource to be opened by a third application, wherein the third application is configured to store information in the encrypted repository.

In yet another implementation, the method further includes: receiving by the first application a request to open a second resource; and determining by the first application that one of the policies allows access by the second resource to a different second encrypted repository and, based thereon, causing the second resource to be opened by a third application, wherein the third application is configured to store information in the second encrypted repository but is not configured to store information in the encrypted repository.

In one implementation, a particular policy determines whether the user can view the second resource, save the data from the second resource outside of the encrypted repository, save data from the second resource within the encrypted repository, copy and paste a portion of the second resource, print the second resource, capture a screen shot of the second resource, edit the second resource, or send a particular protocol-level request.

In another implementation, the method further includes: sending a connection request to a remote server wherein the remote server is configured to create a secure communication channel between the first application and a connection point in an enterprise network through the remote server; and configuring the first application to communicate over the secure communication channel.

In a further implementation, the method further includes: sending a connection request to a remote server from which the remote server can obtain a first transient network address; receiving a second transient network address from the remote server in response to the connection request, the second transient network address being an address of a connection point on an enterprise network; creating a secure communication channel to the connection point using the second transient network address; and configuring the first application to communicate over the secure communication channel.

In yet another implementation, the method further includes: receiving first credentials from the user and authenticating the user based on the first credentials at a first point in time; and using the first credentials to decrypt an encryption key of the repository. The method can further include: determining according to one of the policies that further authentication is required and, based thereon, receiving second credentials from the user; and further authenticating the user based on the second credentials. The method can further include receiving different second credentials from the user at a second point in time which follows the first point in time; and authenticating the user using the second credentials and, based thereon, receiving the encryption key from a remote system.

In one implementation, the first application operates in an off-line mode wherein the first application does not send or receive information over any network. A third resource can store and retrieve information from the encrypted repository while the first application operates in off-line mode. A third application can access the encrypted store while the first application is in the off-line mode.

In another implementation, the method further includes: receiving on the client device credentials from the user and authenticating the user based on the credentials by the first application; creating a secure communication channel between the first application and an enterprise network based on the authentication, wherein the first application is configured to communicate over the secure communication channel; configuring a different third application to allow the user to access the third application through the first application; and communicating with the third application by the first application over the secure communication channel and storing received information from the third application in the encrypted repository on the client device. The secure communication channel can be an encrypted tunnel.

In another aspect, a system includes one or more computers programmed to perform operations including: receiving on a client device a plurality of policies, each policy comprising a respective resource and a respective permission for a respective action that can be performed by a user of the client device in regards to the resource; receiving by a first application a request to open a resource wherein the first application is configured to store data in an encrypted repository on the client device; determining by the first application that one of the policies prohibits access by the resource to the encrypted repository and, based thereon, selecting a different second application to open the resource that does not have access to the encrypted repository; and causing the second application to open the resource.

In one implementation, the resource does not reside within an enterprise network of the user. A particular application can be a web browser or a native application. The resource can be a uniform resource locator.

In another implementation, the operations further include: receiving by the first application a request to open a second resource; and determining by the first application that one of the policies allows access by the second resource to the encrypted repository and, based thereon, opening by the first application the second resource.

In a further implementation, the operations further include: receiving by the first application a request to open a second resource; and determining by the first application that one of the policies allows access by the second resource to the encrypted repository and, based thereon, causing the second resource to be opened by a third application, wherein the third application is configured to store information in the encrypted repository.

In yet another implementation, the operations further include: receiving by the first application a request to open a second resource; and determining by the first application that one of the policies allows access by the second resource to a different second encrypted repository and, based thereon, causing the second resource to be opened by a third application, wherein the third application is configured to store information in the second encrypted repository but is not configured to store information in the encrypted repository.

In one implementation, a particular policy determines whether the user can view the second resource, save the data from the second resource outside of the encrypted repository, save data from the second resource within the encrypted repository, copy and paste a portion of the second resource, print the second resource, capture a screen shot of the second resource, edit the second resource, or send a particular protocol-level request.

In another implementation, the operations further include: sending a connection request to a remote server wherein the remote server is configured to create a secure communication channel between the first application and a connection point in an enterprise network through the remote server; and configuring the first application to communicate over the secure communication channel.

In a further implementation, the operations further include: sending a connection request to a remote server from which the remote server can obtain a first transient network address; receiving a second transient network address from the remote server in response to the connection request, the second transient network address being an address of a connection point on an enterprise network; creating a secure communication channel to the connection point using the second transient network address; and configuring the first application to communicate over the secure communication channel.

In yet another implementation, the operations further include: receiving first credentials from the user and authenticating the user based on the first credentials at a first point in time; and using the first credentials to decrypt an encryption key of the repository. The operations can further include: determining according to one of the policies that further authentication is required and, based thereon, receiving second credentials from the user; and further authenticating the user based on the second credentials. The operations can further include receiving different second credentials from the user at a second point in time which follows the first point in time; and authenticating the user using the second credentials and, based thereon, receiving the encryption key from a remote system.

In one implementation, the first application operates in an off-line mode wherein the first application does not send or receive information over any network. A third resource can store and retrieve information from the encrypted repository while the first application operates in off-line mode. A third application can access the encrypted store while the first application is in the off-line mode.

In another implementation, the operations further include: receiving on the client device credentials from the user and authenticating the user based on the credentials by the first application; creating a secure communication channel between the first application and an enterprise network based on the authentication, wherein the first application is configured to communicate over the secure communication channel; configuring a different third application to allow the user to access the third application through the first application; and communicating with the third application by the first application over the secure communication channel and storing received information from the third application in the encrypted repository on the client device. The secure communication channel can be an encrypted tunnel.

In another aspect, a computer-implemented method includes the steps of: receiving on a client device credentials from a user and authenticating the user based on the credentials by a first application on the client device; creating a secure communication channel between the first application and an enterprise network based on the authentication, wherein the first application is configured to communicate over the secure communication channel; configuring a different second application to allow the user to access the second application through the first application; and communicating with the second application by the first application over the secure communication channel and storing received information from the second application in an encrypted repository on the client device. The second application can reside inside of or outside of the enterprise network.

In one implementation, the method further includes using the credentials to decrypt an encryption key of the repository. The method can further include providing second credentials to the second application to authenticate the user to the second application.

In another implementation, creating the secure communication channel includes: sending a connection request to a remote server wherein the remote server is configured to create the secure communication channel between the first application and a connection point in the enterprise network through the remote server; and receiving an acknowledgement from the remote server that the secure communication channel is established.

In a further implementation, creating the secure communication channel includes: sending a connection request to a remote server from which the remote server can obtain a first transient network address; receiving a second transient network address from the remote server in response to the connection request, the second transient network address being an address of a connection point on the enterprise network; and creating the secure communication channel to the connection point using the second transient network address.

In yet another implementation, configuring the different second application to allow the user to access the second application through the first application includes: authenticating the first application using an authentication provider and configuring the second application to trust the authentication provider.

In one implementation, the method further includes: receiving a plurality of policies, wherein each policy comprises a respective resource and a respective permission for a respective action that can be performed by the user; selecting one or more of the policies that pertain to the second application; and configuring the first application to enforce the selected policies when the user access the second application through the first application. A particular policy can determine whether the user can view the resource, save data from the resource outside of encrypted repository, save the data from the resource within the encrypted repository, copy and paste a portion of data from the resource, print the resource, capture a screen shot of the resource, edit the resource, or send a particular protocol-level request.

In another implementation, the method further includes: receiving by the first application a plurality of policies, each policy comprising a respective resource and a respective permission for a respective action that can be performed by a user of the client device; receiving by the first application a request to open a resource; determining by the first application that one of the policies prohibits access by the resource to the encrypted repository and, based thereon, selecting a different third application to open the resource that does not have access to the encrypted repository; and causing the third application to open the resource.

In another aspect, a system includes one or more computers programmed to perform operations including: receiving on a client device credentials from a user and authenticating the user based on the credentials by a first application on the client device; creating a secure communication channel between the first application and an enterprise network based on the authentication, wherein the first application is configured to communicate over the secure communication channel; configuring a different second application to allow the user to access the second application through the first application; and communicating with the second application by the first application over the secure communication channel and storing received information from the second application in an encrypted repository on the client device. The second application can reside inside of or outside of the enterprise network.

In one implementation, the operations further include using the credentials to decrypt an encryption key of the repository. The operations can further include providing second credentials to the second application to authenticate the user to the second application.

In another implementation, creating the secure communication channel includes: sending a connection request to a remote server wherein the remote server is configured to create the secure communication channel between the first application and a connection point in the enterprise network through the remote server; and receiving an acknowledgement from the remote server that the secure communication channel is established.

In a further implementation, creating the secure communication channel includes: sending a connection request to a remote server from which the remote server can obtain a first transient network address; receiving a second transient network address from the remote server in response to the connection request, the second transient network address being an address of a connection point on the enterprise network; and creating the secure communication channel to the connection point using the second transient network address.

In yet another implementation, configuring the different second application to allow the user to access the second application through the first application includes: authenticating the first application using an authentication provider and configuring the second application to trust the authentication provider.

In one implementation, the operations further include: receiving a plurality of policies, wherein each policy comprises a respective resource and a respective permission for a respective action that can be performed by the user; selecting one or more of the policies that pertain to the second application; and configuring the first application to enforce the selected policies when the user access the second application through the first application. A particular policy can determine whether the user can view the resource, save data from the resource outside of encrypted repository, save the data from the resource within the encrypted repository, copy and paste a portion of data from the resource, print the resource, capture a screen shot of the resource, edit the resource, or send a particular protocol-level request.

In another implementation, the operations further include: receiving by the first application a plurality of policies, each policy comprising a respective resource and a respective permission for a respective action that can be performed by a user of the client device; receiving by the first application a request to open a resource; determining by the first application that one of the policies prohibits access by the resource to the encrypted repository and, based thereon, selecting a different third application to open the resource that does not have access to the encrypted repository; and causing the third application to open the resource.

In another aspect, a computer-implemented method includes the steps of: selecting by a first application a connection point from a plurality of connections points through which a first resource can be accessed, wherein each connection point is deployed on a respective remote system and is configured to provide access to one or more respective resources accessible through the remote system according to a plurality of respective policies; establishing by the first application a secure communication channel to the selected connection point; receiving a plurality of the respective policies, each policy comprising a respective resource and a respective permission for a respective action that can be performed by the user in the first application with regards to the respective resource; identifying a policy of the plurality of policies that allows data from the first resource to be stored in an encrypted repository on a client device; and based on the identifying, communicating with the first resource by the first application over the secure communication channel and storing received information from the first resource in the encrypted repository on the client device. The policies can be received over the secure communication channel.

In one implementation, establishing a connection to the selected connection point includes: sending a connection request to a remote server wherein the remote server is configured to create the secure communication channel between the first application and the selected connection point through the remote server; and configuring the first application to communicate over the secure communication channel.

In another implementation, establishing a connection to the selected connection point includes: sending a connection request to a remote server from which the remote server can obtain a first transient network address; receiving a second transient network address from the remote server in response to the connection request, the second transient network address being an address of the selected connection point; creating the secure communication channel to the connection point using the second transient network address; and configuring the first application to communicate over the secure communication channel.

In a further implementation, a particular connection point is configured to receive the respective policies from the respective remote system or from a system external to the remote system. Establishing a connection to the selected connection point can include providing credentials of a user of the client device to the connection point and receiving an indication of authentication from the selected connection point based thereon. A particular application can be a web browser or a native application. The first resource can be a uniform resource locator.

In yet another implementation, the method further includes: receiving first credentials from the user and authenticating the user based on the first credentials at a first point in time; and using the first credentials to decrypt an encryption key of the repository. The method can further include: determining according to one of the policies that further authentication is required and, based thereon, receiving second credentials from the user; and further authenticating the user based on the second credentials. The method can further include: receiving different second credentials from the user at a second point in time which follows the first point in time; and authenticating the user using the second credentials and, based thereon, receiving the encryption key from a remote system. The secure communication channel can be encrypted.

In another aspect, a system includes one or more computers programmed to perform operations including: selecting by a first application a connection point from a plurality of connection points through which a first resource can be accessed, wherein each connection point is deployed on a respective remote system and is configured to provide access to one or more respective resources accessible through the remote system according to a plurality of respective policies; establishing by the first application a secure communication channel to the selected connection point; receiving a plurality of the respective policies, each policy comprising a respective resource and a respective permission for a respective action that can be performed by the user in the first application with regards to the respective resource; identifying a policy of the plurality of policies that allows data from the first resource to be stored in an encrypted repository on a client device; and based on the identifying, communicating with the first resource by the first application over the secure communication channel and storing received information from the first resource in the encrypted repository on the client device. The policies can be received over the secure communication channel.

In one implementation, establishing a connection to the selected connection point includes: sending a connection request to a remote server wherein the remote server is configured to create the secure communication channel between the first application and the selected connection point through the remote server; and configuring the first application to communicate over the secure communication channel.

In another implementation, establishing a connection to the selected connection point includes: sending a connection request to a remote server from which the remote server can obtain a first transient network address; receiving a second transient network address from the remote server in response to the connection request, the second transient network address being an address of the selected connection point; creating the secure communication channel to the connection point using the second transient network address; and configuring the first application to communicate over the secure communication channel.

In a further implementation, a particular connection point is configured to receive the respective policies from the respective remote system or from a system external to the remote system. Establishing a connection to the selected connection point can include providing credentials of a user of the client device to the connection point and receiving an indication of authentication from the selected connection point based thereon. A particular application can be a web browser or a native application. The first resource can be a uniform resource locator.

In yet another implementation, the operations further include: receiving first credentials from the user and authenticating the user based on the first credentials at a first point in time; and using the first credentials to decrypt an encryption key of the repository. The operations can further include: determining according to one of the policies that further authentication is required and, based thereon, receiving second credentials from the user; and further authenticating the user based on the second credentials. The operations can further include: receiving different second credentials from the user at a second point in time which follows the first point in time; and authenticating the user using the second credentials and, based thereon, receiving the encryption key from a remote system. The secure communication channel can be encrypted.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
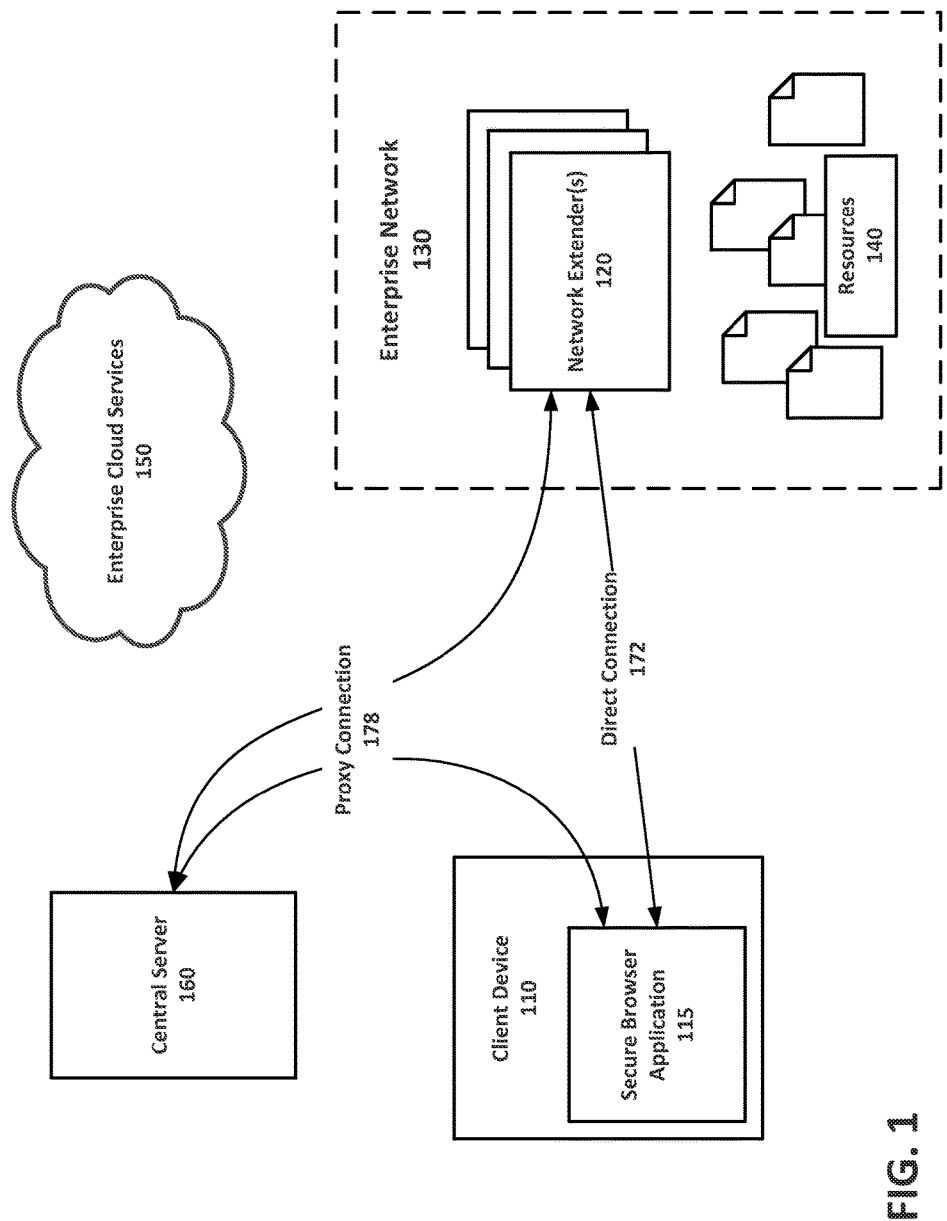
FIG. 1 is a diagram of an example high-level system architecture and network communication paths according to an implementation.

Described herein in various implementations are systems and methods for providing secure access to enterprise network resources from client devices outside the network perimeter. FIG. 1 shows an example high-level system architecture in which a secure browser application 115 on a client device 110 communicates with one or more lightweight network extenders 120 that exist within the perimeter of an enterprise network 130 in order to access internal resources 140. The secure browser application 115 can also communicate with various enterprise cloud services 150 and central server 160, which can be provided by third parties. In some implementations, the browser application 115 is a web browser. In other implementations, the browser application 115 is another type of application. In further implementations, the browser application 115 is realized as one or more software libraries whose functionality is used by one or more other user-facing applications to access secure resources.

The client device 110 can be, for example, a smart phone, tablet computer, portable computer, mobile telephone, laptop, palmtop, smart or dumb terminal, network computer, personal digital assistant, wireless device, information appliance, workstation, minicomputer, mainframe computer, smart watch, smart glasses, television, gaming device, or other computing device, that is operated as a general purpose computer or a special purpose hardware device that can execute the functionality described herein.

A network communications application (e.g., secure browser application 115) executes on the client device 110 to provide for internal access to the enterprise network 130 and resources 140 within the network 130. The secure browser application 115 includes an authentication interface through which a user can enter identifying information (e.g., username, password, biometric identifier, certificate, etc.) necessary to obtain access to the enterprise network 130. In one implementation, the identifying information entered into the secure browser application 115 includes the same or similar information that the user would normally use to authenticate directly with the enterprise network 130 (e.g., a corporate network username and password).

One or more network extenders 120 can be points of presence disposed within the perimeter of the enterprise network 130. Each network extender 120 can be a lightweight application (e.g., a virtual appliance), for example, that operates similarly to an HTTP proxy server, acting as an intermediary between the secure browser application 115 and various resources 140 (e.g., applications, files, directories, services, websites, uniform resource locators (URLs), computers, etc.) within the enterprise network 130 and/or enterprise cloud services 150 outside the enterprise network 130. Other types of network extenders are possible. For example, one or more network extenders 120 can be hosted external to the enterprise network 130, such as in the cloud and/or in proximity to the central server 160. Network extenders 120 can also be installed on or otherwise associated with a server associated with a resource 140 or 150 to expose the particular resource. The network extender 120 can provide access to the resources 140 within the network 130 as well as external resources by, for example, providing a URL associated with the resource to the secure browser application 115, which can access or open the resource via the URL. In some implementations, each network extender 120 controls access to a different set of resources. A secure communication channel (e.g., a secure, encrypted tunnel) can be established between the browser application 115 and a network extender 120. For example, a transport layer security (TLS)/secure sockets layer (SSL) tunnel can be created, the SPDY protocol can be used in conjunction with the tunnel to manipulate the HTTP traffic passing through the tunnel, and various other connections can be layered on top of SPDY. Other types of secure communication channels are possible.

To establish secure a communication channel between the client device 110 and the enterprise network 130, the central server 160 can broker a connection between a connection point in the network 130 (e.g., a network extender 120) and the secure browser application 115 via hole punching (e.g., TCP hole punching, UDP hole punching, etc.) and/or other similar techniques. For example, the secure network browser 115 can send a connection request to the central server 160, exposing the client device's transient network address (e.g., IP address and port information) to the central server 160. The central server 160 can also request and/or receive from the enterprise network 130 (e.g., via a network extender 120) a transient network address in the enterprise network 130 to which the secure network browser 115 can connect. The central server 160 can then provide the network address information to each endpoint to allow a direct connection 172 and secure communication between the two endpoints. The central server 160 can also act as a proxy and pass traffic between the secure browser application 115 and the enterprise network 130 (proxy connection 178) instead of or in addition to the direct communication. In some implementations, the central server 160 is located within the enterprise network 130 so that the organization can maintain control over traffic between the client device 110 and central server 160. In other implementations, the secure browser application 115 is configured to directly connect to one or more specific lightweight network extenders 120 (direct connection 172) such that the central server 160 is not required to set up a connection. In another implementation, the network address information associated with one or both endpoints is static rather than transient.

External resources that are outside the enterprise network 130 can be transparently accessible to the user of the secure browser application 115 via single sign-on functionality. For example, the browser application 115 can be used to access external resources from outside from the enterprise network 130 without requiring further authentication. External resources can include enterprise cloud services 150 (e.g., Salesforce.com) and non-enterprise resources (e.g., personal websites such as Facebook). Enterprise policy can govern which external resources the user is permitted to access through the secure browser application 115, or whether the user is allowed to access any external resources at all.

Figure 2:
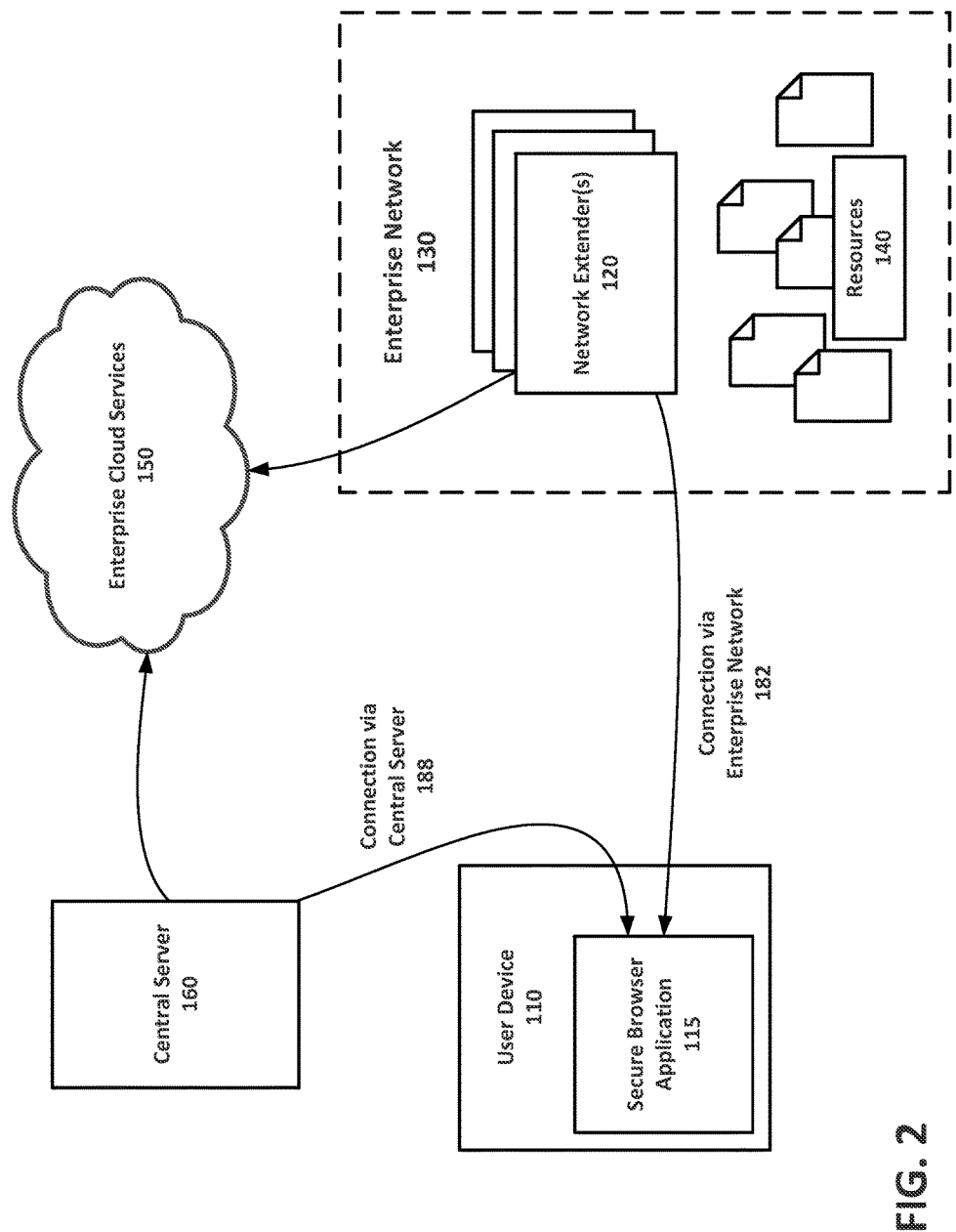
FIG. 2 is a diagram of an example high-level system architecture and network communication paths according to an implementation.

As shown in FIG. 2, a network connection to external resources can be routed through the enterprise network 130 (connection 182) if, for example, the external resource requires the user's connection to source from within the enterprise network 130. Alternatively or in addition, a network connection to external resources can be routed through the central server 160 (connection 188). Depending on the mode of connection, the network extender 120 or central server 160 can provide or forward (from the secure browser application 115) user credentials required by the external resource for authentication. In one implementation, the required credentials can be passed using a Security Assertion Markup Language (SAML) authorization token associated with enterprise users that are permitted to access the external resource. The SAML authorization token or other credentials can be provided by a third-party authentication provider (e.g., SAML provider), and the external resource can be configured to trust the third-party authentication provider. In other implementations, the single sign-on function generates a username and password and provides the generated credentials to the external resource when the user attempts to access it. This operation can be performed transparently to the user, such that the user never sees the generated credentials and does not have to manually provide them to the external resource to authenticate.

Figure 3:
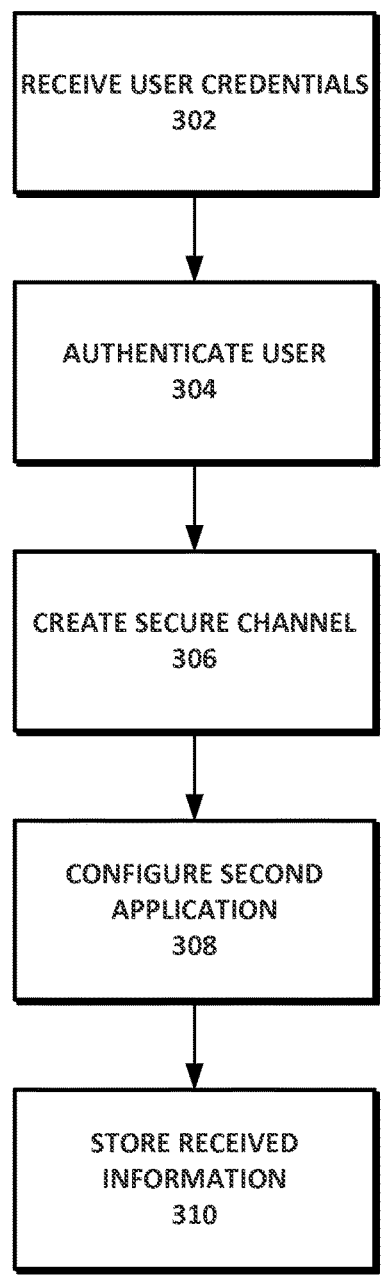
FIG. 3 is a flowchart illustrating an example method of performing single sign-on authentication according to an implementation.

FIG. 3 illustrates an example process for single sign-on authentication. In STEP 302, a first application on a user device (e.g., secure browser application 115) receives user credentials and, in STEP 304, authenticates the user. Once the user is authenticated, a secure communication channel is created between the first application and the enterprise network 130 to allow for communication over the channel by the first application (STEP 306). The channel can be created as described herein; for example, the central server 160 can broker a connection between the secure browser application 115 and a network extender 120 in the enterprise network 130. In STEP 308, a second, different application is configured to allow the user to access the second application through the first application. For example, an enterprise cloud service like Salesforce.com can be configured to transparently accept a sign-on token or user credentials as described above, such that the user can access Salesforce.com through the secure browser application 115 without the need for additional authentication. In further implementations, the second application is configured to prevent a given user from logging in unless the user has first logged into the secure browser application. In addition to external resources such as enterprise cloud services 150, the second application can reside within the enterprise network 130. Then, in STEP 310, the first application can communicate with the second application over the secure communication channel and store information that is received from the second application in an encrypted repository on the client device. The user credentials can be used to decrypt an encryption key of the repository.

The secure browser application 115 can be configured, at least initially, to be unassociated with any particular enterprise network or organization. Rather, in some implementations, the browser application 115 is installed on the client device, the user enters identifying information into the application 115, and the user's identifying information is transmitted to the central server 160, which determines which enterprise network the user should be connected to. This determination can be based on, for example, a portion of the user's identifying information that is unique (e.g., corporate email address). The central server 160 can then direct the secure browser application 115 to connect, directly or indirectly, to a lightweight network extender 120 within the enterprise network 130. Authentication can be performed by or through the central server 160, the network extender 120, or at both points in one or more stages. For example, the secure browser application 115 or central server 160 can pass the user's authentication information to a network extender 120, which communicates with an authentication server within the enterprise network 130 (e.g., authentication through a service using Active Directory, Lightweight Directory Access Protocol (LDAP), SAML, or other protocol and/or service).

In some implementations, as an alternative to trusting and/or transmitting the user's identifying information to a third-party central server external to the enterprise network 130 to determine which network to connect to, an annotated Domain Name Server (DNS) record for the enterprise can be referenced. Specifically, the enterprise can annotate its DNS record to provide a signed token to the secure browser application 115 so that, upon looking up the DNS record to determine which network entry point to connect to, the application 115 can confirm that the record has not been comprised (e.g., by DNS hijacking).

In one implementation, the secure browser application 115 stores its data in a single encrypted repository, such as an encrypted file (or, in some implementations, a plurality of encrypted repositories) governed by enterprise policy. The encrypted repository can incorporate an internal file system separate from the file system of the operating system, and data that the browser application 115 would otherwise write as various unencrypted files on a storage medium (e.g., browser cache, cookies, downloaded files, emails, and so on) is instead written to the internal file system of the encrypted repository. Various suitable encryption and decryption algorithms can be used to respectively encrypt and decrypt the data in the encrypted repository.

The encrypted repository can be made accessible (e.g., decrypted) upon the user entering his enterprise network credentials in the secure browser application 115 and being successfully authenticated by the enterprise network 130. The decryption key for the encrypted repository can be, for example, the same as the user's enterprise network password. In some implementations, network connectivity is not required for the user to be able to access the encrypted repository. Instead, the secure browser application 115 can operate in an offline mode (further described below), and the user can unlock the encrypted repository with the enterprise network credentials that were used to encrypt it. In further implementations, decryption keys are stored within the enterprise network 130 on a trusted repository (e.g., on one or more of the network extenders 120) to provide for secure key recovery. For example, if a password rotation or change occurs with respect to the user's enterprise network credentials, but the encrypted repository on the user's device is still encrypted with the previous decryption key (e.g., password), the user can enter his new credentials into the secure browser application 115, which can authenticate with the enterprise network 130. Upon successful authentication with the user's current credentials, the previous decryption key can be recovered and transmitted to the user's device through a secure tunnel to a network extender 120 in the enterprise network 130. The recovered key can then be used to decrypt the encrypted repository, which can then be encrypted based on the user's current credentials.

In one implementation, the secure browser application 115 can operate in an offline mode. For example, while having a network connection, a user can download resources (e.g., synchronize email, save documents, etc.) into the encrypted repository. If the browser application 115 is placed in offline mode (either manually or automatically by detecting a lack of network connection), the user remains able to open the browser application 115 and unlock the encrypted repository with his credentials. The user can then view, modify, and perform other actions on the saved resources in offline mode (e.g., edit documents, draft emails and queue them for sending, etc.). Once the secure browser application 115 reenters an online mode, any pending actions can be completed (e.g., send and receive emails, synchronize documents, etc.). In some implementations, the secure browser application 115 interfaces with plug-ins or extensions that support offline functionality. For example, the browser application 115 can interface with a Gmail browser extension that provides for operation in an offline mode, and the data created and accessed by the extension can be restricted to the confines of the encrypted repository of the browser application 115.

The enterprise can define policies that define permitted and/or restricted user actions and resources. Policies can be configured and applied to specific user groups, resource groups, and/or device groups. Enterprise policies can be stored on and/or transmitted to the secure browser application 115 by the central server 160, one or more of the network extenders 120, and/or other policy servers internal or external to the enterprise network 130. In one implementation, the central server 160 (or other policy server) includes a user interface (e.g., a web-based interface) to allow an administrator to configure and manage enterprise policies remotely.

Policies can define whether a particular user, device and/or resource (e.g., application, service, website, etc.), or a group of the foregoing, can access particular resources (whether internal, external, enterprise, non-enterprise, etc.). Policies can further define which actions can be performed via the secure browser application 115. Such actions can include, but are not limited to, read data, write data, modify data, copy data, move data, download data, save data to a local device, copy/cut/paste data, capture a screenshot, print a resource, execute an application, send a protocol-level request, and so on. In some implementations, the secure browser application 115 can be configured to enforce a particular policy or policies when an external resource (e.g., external enterprise and/or non-enterprise resource) is accessed through the secure browser application 115. As one example, a policy can be applied to a particular external enterprise resource, such as the Salesforce.com website, that allows users to copy and paste data from the site outside of the secure browser application 115, but not to save files from the website outside of the encrypted repository of the secure browser application 115. As another example, a policy can be applied to a group of client devices, such as laptops, so that users on the laptops are permitted to edit documents from an enterprise document management system, while users of smartphones are only permitted to view documents.

In another example, the enterprise policies can permit a user to read and/or write resource data outside of the encrypted repository of the secure browser application 115 (e.g., a user needs to save a presentation file to an external storage medium, a user needs to attach to an email a file that exists outside of the encrypted repository, etc.). The enterprise policy can also include exceptions that allow a user to take an action that is against policy, but only if the user confirms and acknowledges that the action is contrary to enterprise policy or otherwise not recommended. The user can also be required to enter a reason why the action was taken.

In some implementations, to facilitate policy configuration, the policy administration user interface (e.g., on the central server 160) can recommend a best practice policy for particular resources and/or particular types or categories of resources. For example, an enterprise cloud service such as Salesforce.com generally includes information that is confidential or sensitive to an organization. Accordingly, the administration interface can recommend a policy that allows users to copy and paste snippets of text or images from the website and upload files from the encrypted repository, but restricts users from printing or downloading files entirely. The recommended policy can be a starting point that is further configurable and modifiable by an administrator.

The enterprise policies can dictate whether a particular user and/or client device is permitted to access non-enterprise resources (e.g., resources that are not within the enterprise network 130 and are not defined as external enterprise resources). In some instances, the user is not permitted to access any non-enterprise resources through the secure browser application 115 whereas, in other instances, the user is permitted to access non-enterprise resources that are whitelisted or not blacklisted through the application 115.

In one implementation, if a user is not permitted to access a particular resource (e.g., based on a policy), the secure browser application 115 opens a different application on the client device 110 that supports the resource, but does not have access to the encrypted repository and/or enterprise resources (e.g., enterprise resources 140, enterprise cloud services 150). For example, if the Facebook.com website is not defined as an enterprise resource, and the enterprise policy does not permit non-enterprise websites to be accessed using the secure browser application 115, the secure browser application 115 can redirect the website request to a different browser application on the client device, such as Chrome or Firefox. The user can then browse Facebook using the different browser application. Upon opening a non-permitted resource, the user can be deauthenticated from the enterprise network 130 and the secure browser application 115 can be closed or, alternatively, the secure browser application 115 can remain running with the user authenticated (until, for example, a timeout occurs or the client device is turned off).

In another implementation, the secure browser application 115 can open a different application on the client device 110 that supports a particular resource and has access to the encrypted repository. For example, if a user downloads a Word document through the secure browser application 115, a policy can allow for a Word document-compatible application to be executed and to open the document, and also permit the Word application access to the encrypted repository (e.g., the Word application can be permitted to read, write, and/or modify data in the repository).

In some situations, the secure browser application 115 can open a different application on the client device 110 that supports a particular resource and has access to a second encrypted repository that is different than the encrypted repository associated with the browser application 115. In one implementation, data cannot be transferred between the two encrypted repositories, and/or the different application is not permitted access to the first encrypted repository. For example, if a user downloads an Excel spreadsheet through the secure browser application 115 and attempts to open it, a policy can permit the browser application 115 to execute the Excel application in a sandbox with temporary, bounded in time access to the spreadsheet file. The different application opened by the secure browser application 115 can be a native application on the client device 110 and/or an extension, add-on, or plug-in of the browser application 115. For example, in one implementation the secure browser application 115 is based on the Google Chrome browser, and enterprise policy can permit certain extensions to be installed to support spreadsheets, documents, databases, emails, and other resource types. Extensions can also be installed to support additional protocols and non-HTTP/S services, as RDP, SSH, and VNC.

Figure 4:
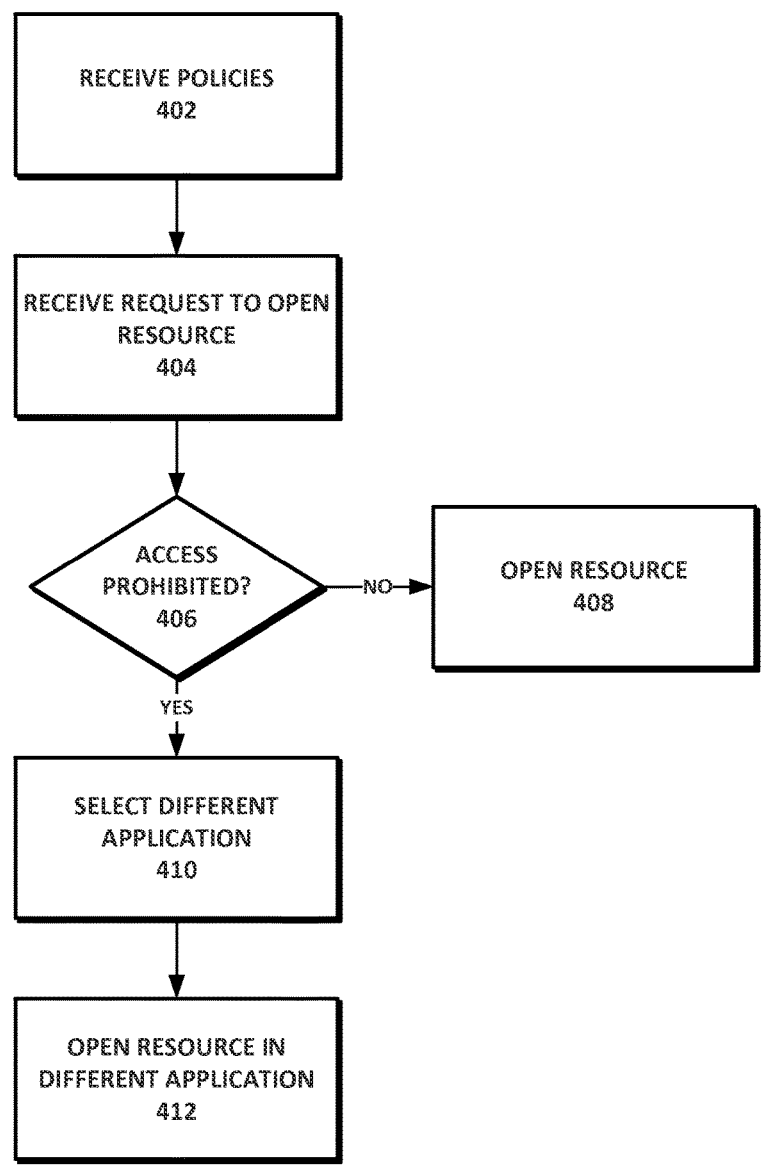
FIG. 4 is a flowchart illustrating an example method of redirecting a resource access request to an alternative application.

FIG. 4 illustrates an example process for redirecting a request for a non-authorized resource. In STEP 402, a plurality of polices are received on a client device. Each policy includes a respective resource and a respective permission for a respective action that can be performed by a user of the client device with respect to the resource. The resource can be an enterprise resource or a non-enterprise resource, and can be internal or external to the enterprise network 130. In one example, a particular policy can specify that the user is permitted to capture screenshots of Salesforce.com webpages. In STEP 404, an application (e.g., secure browser application 115, a web browser, a native application, or other application) receives a request to open a resource. As described herein, the application can be configured to store data in an encrypted repository on the client device. In STEP 406, a determination is made by the secure browser application 115 as to whether one of the policies prohibits access, by the resource, to the encrypted repository. If access is permitted, the resource is accessed and/or opened and is permitted to access the encrypted repository (STEP 408). If, however, such access is prohibited, a different, second application is selected to open the resource (STEP 410). The different application is permitted to open the resource but does not, however, have access to the encrypted repository (STEP 412).

In one implementation, the environment in which the secure browser application 115 executes can include various measures to maintain the security of the application 115 and encrypted repository. For example, the operating system on the user device 110 can be configured so that decrypted data held in memory is not written to a swap file. The secure browser application 115, as well as other applications spawned by the browser application 115, can be isolated in execution to prevent malicious processes from reading the memory space of the applications. A remote wipe of data on the user device 110 can be performed upon a determination that the user is no longer authorized to access the data. For example, if the user is no longer associated with an organization and attempts to execute or authenticate with the secure browser application 115, the central server 160 (or other authentication server) can instruct the browser application 115 to securely delete the encrypted repository, which may contain the organization's data. If the user is associated with a new organization, a new repository can be created and encrypted based on the user's new credentials.

In some implementations, multiple network extenders 120 are disposed within the enterprise network 130. Each network extender 120 can be associated with one or more network segments and/or machines within the enterprise. Further, each network extender 120 can be associated with the same or a different set of policies. For example, the enterprise might have its software developers and source code on a segregated secure subnet in the enterprise network 130. The enterprise desires to allow remote access to the source code and other resources in the subnet, but in a more limited fashion than is permitted in other segments of the enterprise network 130. In such a case, a separate network extender can be specifically associated with the developer network segment. The separate network extender can have its own custom policy set that, for example, limits the actions that remote users can take with respect to resources accessed via the separate network extender (e.g., disallow saving source code off the developer network).

Figure 5:
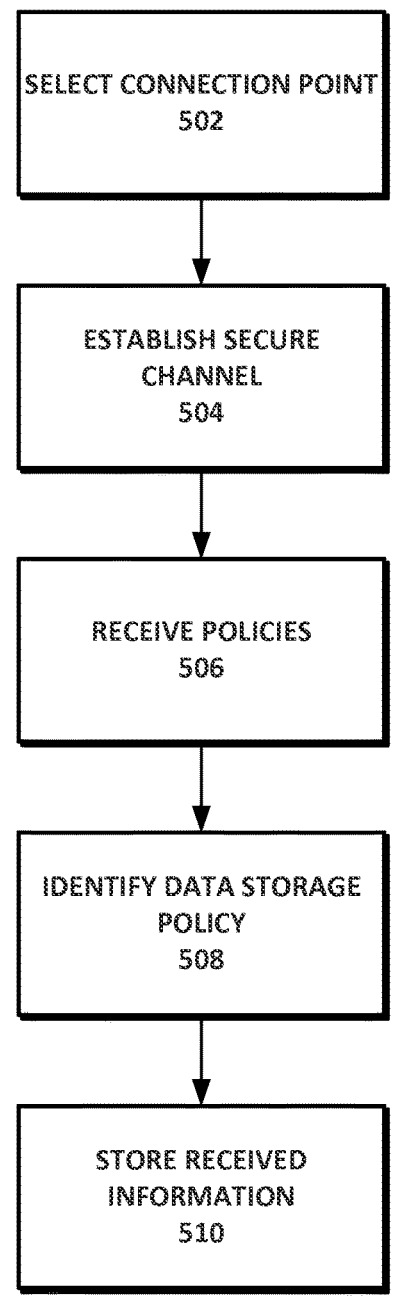
FIG. 5 is a flowchart illustrating an example method of selecting an connection point for policy-based resource access.

FIG. 5 illustrates an example process for selecting a connection point (e.g., a particular network extender 120 in the enterprise network 130) for policy-based resource access. In STEP 502, a first application (e.g., secure browser application 115, a web browser, native application, or other application) on a client device selects a connection point from multiple connection points through which a resource (e.g., URL, file, website, computer, application, service, etc.) can be accessed. In some implementations, however, the resource might only be accessible through a single connection point. Each of the connection points is deployed on a respective remote system and is configured to provide access to one or more resources that are accessible through the remote system. Access to the resources can be defined by policies that can be respectively associated with the connection points. In STEP 504, the secure browser application 115 establishes a secure communication channel to the selected network extender 120. The connection can be established using one or more of the methods described herein. Credentials associated with a user of the client device can be provided to the connection point for authentication, and an indication of authentication can be received in return.

One or more policies can be defined that specify permissions regarding particular actions to be taken with respect to specific resources (STEP 506). The policies can be applied to user groups, device groups, resource groups, and/or combinations of the foregoing, and can define permissible or restricted resource access and/or user actions, such as those described above. The policies can be stored at the network extender 120 or at a central server 160 or other system external to the enterprise network 130, and can be provided to the secure browser application 115 through the secure communication channel upon connecting to the connection point and/or upon attempting to access a particular resource. The policies can be applied by the browser application 115, by the connection point, by the resource, and/or by other suitable policy functionality. In STEP 508, an applicable policy is identified that allows data from the resource to be stored in an encrypted repository on the client device 110 executing the secure browser application 115. For example, the policy might specify that the user of the client device 110 is permitted to download email attachments into the encrypted repository. Then, based on the policy identification, the secure browser application 115 communicates with the resource over the secure communication channel and stores received information from the resource in the encrypted repository.

Implementations of the present system can use appropriate hardware or software; for example, the policy administration interface, network extenders 120, and/or secure browser application 115 can execute on a system capable of running an operating system such as the Microsoft Windows® operating systems, the Apple OS X® operating systems, the Apple iOS® platform, the Google Android™ platform, the Linux® operating system and other variants of UNIX® operating systems, and the like.

The functionality described herein, such as the secure browser application 115, can be implemented in software and/or hardware on a client device 110. A client device 110 can include, but is not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device, that is operated as a general purpose computer or a special purpose hardware device that can execute the functionality described herein. The software, for example, can be implemented on a general purpose computing device in the form of a computer including a processing unit, a system memory, and a system bus that couples various system components including the system memory to the processing unit.

Additionally or alternatively, some or all of the functionality can be performed remotely, in the cloud, or via software-as-a-service. For example, as described above, certain functions, such as those provided by the central server 160, can be performed on one or more servers or other devices that communicate with client devices 110. The remote functionality can execute on server class computers that have sufficient memory, data storage, and processing power and that run a server class operating system (e.g., Oracle® Solaris®, GNU/Linux®, and the Microsoft® Windows® family of operating systems).

The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various implementations, a client device 110 includes a web browser, native application, or both, that facilitates execution of the functionality described herein. A web browser allows the device to request a web page or other program, applet, document, or resource (e.g., from the enterprise network 130, the central server 160 or other server, such as a web server) with an HTTP request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the client device 110 manually requests a resource from a server. Alternatively, the device 110 automatically makes requests with a browser application. Examples of commercially available web browser software include Microsoft® Internet Explorer®, Mozilla® Firefox®, and Apple® Safari®.

In some implementations, the client device 110 includes client software, such as the secure browser application 115. The client software provides functionality to the device 110 that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with a web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

A communications network can connect client devices with one or more remote servers or devices, such as central server 160, network extenders 120, and enterprise cloud services 150. The communication can take place over media such as standard telephone lines, LAN or WAN links (e.g., T1, T3, 56kb, X.25), broadband connections (ISDN, Frame Relay, ATM), wireless links (802.11 (Wi-Fi), Bluetooth, GSM, CDMA, etc.), for example. Other communication media are possible. The network can carry TCP/IP protocol communications, and HTTP/HTTPS requests made by a web browser, and the connection between the client device and servers can be communicated over such TCP/IP networks. Other communication protocols are possible.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
    receiving on a client device first credentials from a user and authenticating the user with an enterprise network based on the credentials through a first application on the client device, wherein the first application comprises a secure web browser executing on the client device;
    creating a secure communication channel between the first application and the enterprise network based on the authentication by:
        sending a connection request to a remote server from which the remote server can obtain a first transient network address from the client device,
        receiving a second transient network address from the remote server in response to the connection request, the second transient network address being an address of a connection point on the enterprise network, and
        creating the secure communication channel to the connection point using the second transient network address, wherein the first application is configured to communicate over the secure communication channel;
    receiving at the client device an indication that the user has been authenticated by a second, different application external to the enterprise network and configured for access through the first application, wherein second credentials generated based on the authentication of the user with the enterprise network are provided via the enterprise network, in a manner transparent to the user, to the second application for the authentication by the second application;
    communicating with the second application by the first application over the secure communication channel;
    storing received information from the second application in an encrypted repository on the client device;
    receiving by the first application a plurality of policies, each policy comprising a respective resource and a respective permission for a respective action that can be performed by a user of the client device;
    receiving by the first application a request to open a resource;
    determining by the first application that one of the policies prohibits access by the resource to the encrypted repository and, based thereon, selecting a different third application to open the resource that does not have access to the encrypted repository; and
    causing the third application to open the resource.

2. The method of claim 1, further comprising using the credentials to decrypt an encryption key of the repository.

3. The method of claim 1 wherein creating the secure communication channel comprises:
    sending a connection request to a remote server wherein the remote server is configured to create the secure communication channel between the first application and a connection point in the enterprise network through the remote server; and
    receiving an acknowledgement from the remote server that the secure communication channel is established.

4. The method of claim 1 wherein the first application is authenticated using an authentication provider and the second application is configured to trust the authentication provider.

5. The method of claim 1, further comprising:
    receiving a plurality of policies, wherein each policy comprises a respective resource and a respective permission for a respective action that can be performed by the user;
    selecting one or more of the policies that pertain to the second application; and
    configuring the first application to enforce the selected policies when the user accesses the second application through the first application.

6. The method of claim 5 wherein a particular policy determines whether the user can view the resource, save data from the resource outside of encrypted repository, save the data from the resource within the encrypted repository, copy and paste a portion of data from the resource, print the resource, capture a screen shot of the resource, edit the resource, or send a particular protocol-level request.

7. A system comprising:
    one or more computers programmed to perform operations comprising:
        receiving on a client device first credentials from a user and authenticating the user with an enterprise network based on the credentials through a first application on the client device, wherein the first application comprises a secure web browser executing on the client device;
        creating a secure communication channel between the first application and the enterprise network based on the authentication by:
            sending a connection request to a remote server from which the remote server can obtain a first transient network address from the client device,
            receiving a second transient network address from the remote server in response to the connection request, the second transient network address being an address of a connection point on the enterprise network, and
            creating the secure communication channel to the connection point using the second transient network address, wherein the first application is configured to communicate over the secure communication channel;
        receiving at the client device an indication that the user has been authenticated by a second, different application external to the enterprise network and configured for access through the first application, wherein second credentials generated based on the authentication of the user with the enterprise network are provided via the enterprise network, in a manner transparent to the user, to the second application for the authentication by the second application;

communicating with the second application by the first application over the secure communication channel;
storing received information from the second application in an encrypted repository on the client device;
receiving by the first application a plurality of policies, each policy comprising a respective resource and a respective permission for a respective action that can be performed by a user of the client device;
receiving by the first application a request to open a resource;
determining by the first application that one of the policies prohibits access by the resource to the encrypted repository and, based thereon, selecting a different third application to open the resource that does not have access to the encrypted repository; and
causing the third application to open the resource.

8. The system of claim 7, wherein the operations further comprise using the credentials to decrypt an encryption key of the repository.

9. The system of claim 7 wherein creating the secure communication channel comprises:
sending a connection request to a remote server wherein the remote server is configured to create the secure communication channel between the first application and a connection point in the enterprise network through the remote server; and
receiving an acknowledgement from the remote server that the secure communication channel is established.

10. The system of claim 7, wherein the first application is authenticated using an authentication provider and the second application is configured to trust the authentication provider.

11. The system of claim 7, wherein the operations further comprise:
receiving a plurality of policies, wherein each policy comprises a respective resource and a respective permission for a respective action that can be performed by the user;
selecting one or more of the policies that pertain to the second application; and
configuring the first application to enforce the selected policies when the user accesses the second application through the first application.

12. The system of claim 11 wherein a particular policy determines whether the user can view the resource, save data from the resource outside of encrypted repository, save the data from the resource within the encrypted repository, copy and paste a portion of data from the resource, print the resource, capture a screen shot of the resource, edit the resource, or send a particular protocol-level request.

* * * * *